US012760884B2

(12) United States Patent
Rein et al.

(10) Patent No.: US 12,760,884 B2
(45) Date of Patent: Oct. 13, 2026

(54) SEALING FRAME FOR A LAMP OPTICAL SYSTEM

(71) Applicant: Zumtobel Lighting GmbH, Dornbirn (AT)

(72) Inventors: Thomas Rein, Dornbirn (AT); Christian Kohler, Dornbirn (AT)

(73) Assignee: Zumtobel Lighting GmbH, Dornbirn (AT)

(*) Notice: Subject to any disclaimer, the term of this patent is extended or adjusted under 35 U.S.C. 154(b) by 255 days.

(21) Appl. No.: 18/705,694

(22) PCT Filed: Nov. 15, 2022

(86) PCT No.: PCT/EP2022/081893
§ 371 (c)(1),
(2) Date: Apr. 29, 2024

(87) PCT Pub. No.: WO2023/084102
PCT Pub. Date: May 19, 2023

(65) Prior Publication Data

US 2026/0160411 A1 Jun. 11, 2026

(30) Foreign Application Priority Data

Nov. 15, 2021 (EP) .................................... 21208173

(51) Int. Cl.
*F21V 31/00* (2006.01)
*F21S 8/04* (2006.01)
(Continued)

(52) U.S. Cl.
CPC ............ *F21V 31/005* (2013.01); *F21S 8/043* (2013.01); *F21V 5/007* (2013.01); *F21V 2200/20* (2015.01); *F21Y 2115/10* (2016.08)

(58) Field of Classification Search
CPC .................................................... F21V 31/005
See application file for complete search history.

(56) References Cited

U.S. PATENT DOCUMENTS

2012/0188766 A1* 7/2012 Lu ......................... F21V 17/005 362/249.02
2015/0267910 A1* 9/2015 Lazalier .................... F21K 9/60 362/267
(Continued)

FOREIGN PATENT DOCUMENTS

CN 206300059 U 7/2017
CN 211724513 U 10/2020
(Continued)

OTHER PUBLICATIONS

PCT/EP2022/081893, International Search Report and Written Opinion dated Mar. 15, 2023, 6 pages.
(Continued)

*Primary Examiner* — Zheng Song
(74) *Attorney, Agent, or Firm* — Andrus Intellectual Property Law, LLP

(57) ABSTRACT

The present invention relates to a sealing frame (1) for sealing insertion between a luminaire optical system (6) and a luminaire housing (9) of a luminaire (100), comprising a supporting frame (2) having a peripherally extending main frame (3) surrounding an inner region (I), wherein the supporting frame (2) or at least the main frame (3) thereof is produced from a light-transparent material, and a sealing element (5) which is connected to the main frame (3) in such a way that the sealing element (5) extends in a peripherally closed manner along the main frame (3) and protrudes away from same. The invention also relates to an optical system (10) comprising a luminaire optical system (6) and the sealing frame (1). The invention also relates to a luminaire (100) comprising a luminaire housing (9) and the optical system (10). The invention further relates to a kit for providing an optionally sealing optical system (10) and to a kit for providing an optionally sealed luminaire (100).

6 Claims, 5 Drawing Sheets

(51) Int. Cl.
*F21V 5/00* (2018.01)
*F21Y 115/10* (2016.01)

(56) References Cited

U.S. PATENT DOCUMENTS

| | | | | |
|---|---|---|---|---|
| 2017/0370553 | A1* | 12/2017 | Demuynck | F21V 29/74 |
| 2020/0355360 | A1* | 11/2020 | Clark | F21V 17/005 |
| 2021/0131658 | A1 | 5/2021 | Verhoeven | |
| 2021/0222852 | A1* | 7/2021 | Yokoi | F21S 43/14 |
| 2023/0023685 | A1* | 1/2023 | Crick | F21V 17/06 |

FOREIGN PATENT DOCUMENTS

| | | | | | |
|---|---|---|---|---|---|
| CN | 212008921 | U | | 11/2020 | |
| CN | 212510541 | U | * | 2/2021 | F21V 5/007 |
| DE | 102019112685 | A1 | | 11/2020 | |
| DE | 102020101162 | A1 | | 7/2021 | |
| EP | 2239498 | A1 | | 10/2010 | |
| WO | WO-2013041474 | A1 | * | 3/2013 | F21V 31/04 |
| WO | 2020094857 | A1 | | 5/2020 | |

OTHER PUBLICATIONS

EP21 208 173.1, European Search Report dated Mar. 24, 2025, 2 pages.

* cited by examiner

SEALING FRAME FOR A LAMP OPTICAL SYSTEM

CROSS-REFERENCE TO RELATED APPLICATION

The present application is the U.S. national stage application of international application PCT/EP 2022/081893 filed Nov. 15, 2022, which international application was published on May 19, 2023 as International Publication WO 2023/084102 A1. The international application claims priority to European Patent Application No. 21208173.1, filed Nov. 15, 2021.

TECHNICAL FIELD OF THE INVENTION

The present invention relates to a sealing frame for sealing insertion between a luminaire optical system and a luminaire housing of a luminaire, a corresponding optical system for a luminaire comprising the luminaire optical system and the sealing frame, a luminaire comprising a luminaire housing and the optical system, a kit for providing an optionally sealing optical system with a plurality of luminaire optical systems and sealing frames, and to a kit for providing an optionally sealed luminaire.

BACKGROUND OF THE INVENTION

In the prior art, luminaires are known which accommodate illuminants in a luminaire housing, which illuminants emit light via a luminaire optical system arranged on the luminaire housing and serving to influence the light. A region between the luminaire optical system and the luminaire housing can be structurally designed in such a way that a contact is as flat as possible. However, this region is often susceptible to the ingress of dust and/or water, so that such luminaires—even if their luminaire housing and luminaire optical system delimit a substantially closed luminaire compartment to accommodate the illuminants—have only a low protection rating of, for example, IP40 or even just IP20.

In order to increase the protection rating, it is generally known to provide a seal between the luminaire optical system and the luminaire housing to seal the luminaire compartment off from the outside. For example, the housing may be fitted with foam beads against which the luminaire optical system presses in order to achieve a correspondingly higher protection rating. However, this usually leads to higher process costs and low process reliability, in particular in interlinked systems, due to the time-consuming application of the foam beads. A corresponding foam bead can also have a negative visual impact on the luminaire because it is sometimes applied voluminously and can therefore be visible through the luminaire optical system. Furthermore, a foam bead applied in this way is difficult or impossible to replace when necessary, e.g., if it has become brittle due to age.

It is also known to provide a seal directly on the luminaire optical system itself. However, this leads to complex installation and carries the risk of incorrect installation, which can impair the protection rating. It is also conceivable to inject a seal directly onto the luminaire optical system. However, this generally leads to a high level of complexity in the tools used to manufacture the luminaire optical system on the one hand and a high level of complexity in the number of articles on the other hand.

SUMMARY OF THE INVENTION

It is therefore an object of the present invention to provide a luminaire optical system, or a luminaire equipped therewith, which can be easily increased in the protection rating thereof.

This object is achieved by the subject matter of the independent claims. The dependent claims develop the central idea of the present invention in a particularly advantageous manner.

According to a first aspect, the present invention relates to a sealing frame for sealing insertion between a luminaire optical system and a luminaire housing of a luminaire. The sealing frame has a supporting frame having a peripherally extending main frame. The main frame surrounds an inner region. The supporting frame or at least the main frame thereof is produced from a light-transparent material. The sealing frame also has a sealing element which is connected to the main frame in such a way that the sealing element extends in a peripherally closed manner along the main frame and protrudes away from same.

By means of a sealing frame formed in this way, a corresponding sealing element can be provided as a simple insertion part for luminaire optical systems, which is preferably dimensionally stable or more dimensionally stable due to the supporting frame. This means that a corresponding luminaire optical system can optionally be fitted with the sealing element to increase the IP protection rating accordingly if required. A protection rating of IP 64 or higher is conceivable here, for example. Because the supporting frame or the main frame thereof is produced from a light-transparent material, the seal can be provided extremely effectively and at the same time in a visually unobtrusive manner. The supporting frame in turn allows particularly easy handling of the sealing element and ensures secure and defined placement of same on a luminaire optical system, which in turn leads to a high level of functional integration and process reliability. The sealing frame therefore allows the IP protection rating of a luminaire to be optionally raised as required in a particularly simple, effective and safe way without unnecessarily affecting the appearance or aesthetics thereof.

The main frame can preferably extend in a peripherally closed manner. This provides a particularly stable supporting frame, which also allows the sealing element to be positioned and aligned extremely effectively. In principle, it is also conceivable that the main frame is provided in a plurality of parts and/or in a slotted form. The latter makes it possible, for example, to bend the main frame slightly resiliently for installation, where necessary, in order to insert it into a luminaire optical system, for example, where it can relax again for exact positioning of the sealing element and return to the original shape thereof. The variant extending in a peripherally closed manner is particularly preferred for a sealing frame with a high degree of dimensional stability.

The direction of extension of the main frame (i.e., along the peripheral extension thereof) can substantially run in one plane. This means that the supporting frame, and therefore the sealing frame as a whole, can be designed to save as much space as possible. In principle, the course or extension of the main frame is not restricted by the present invention, but is usually preferably based on the corresponding design of the luminaire optical system to be provided therewith.

The main frame can preferably have an elongated cross section, when viewed in the direction of extension thereof, with an inner side and outer side extending between two opposite end faces, wherein the inner side faces the inner region. The elongated shape makes it possible to provide a particularly stable main frame and thus an overall stable sealing frame. Due to the elongated extension described above, the main frame can also be designed in such a way that it can be easily inserted into a luminaire optical system transversely or perpendicular to the plane of extension thereof. In this way, an overall stable main frame can be provided which can be recessed as completely as possible into the luminaire optical system by providing a suitable sealing element with a stable design. Because the main frame is produced from the light-transparent material, it remains visually unobtrusive.

The sealing element can preferably extend from one of the end faces (preferably the end face facing away from the direction of placement or insertion of the sealing element on/into a luminaire optical system); this is preferably in the direction of the elongated cross-sectional extension of the main frame and/or laterally outwardly in relation to the inner region. The sealing element is thus preferably provided on an edge portion of the main frame and can thus be provided particularly effectively, while the main frame, as described, can preferably be recessed in the luminaire optical system. The main frame can thus also provide further functional portions and, for example, be supported on the outer side of the luminaire optical system—preferably on an optically non-active region thereof—in order to achieve a secure alignment and positioning of the sealing element.

Preferably, the elongated cross-sectional area of the main frame tapers from one of the end faces—preferably the end face containing the sealing element, such as the end face facing away from the direction in which the sealing element is placed or inserted on/into a luminaire optical system—toward the opposite end face. This makes it easier to insert the main frame into a luminaire optical system. The wedge-shaped main frame, for example, can thus serve as an insertion bevel due to the sloping sides thereof (preferably at least the outer side thereof) in relation to the direction of placement or insertion. In principle, it is sufficient if at least the outer side is inclined inward toward the inner region in relation to the direction of placement or insertion and when viewed in the direction of placement or insertion in order to achieve the effect of an insertion bevel.

The supporting frame can also have a support structure that reinforces the main frame and is connected to the main frame, preferably on the inner side. This means that the main frame can be designed to be particularly dimensionally stable, in particular in the case of large luminaires, which allows precise alignment and positioning of the sealing element even under these conditions.

The support structure can preferably extend at least partially or completely within the inner region. This means that the support structure does not affect the overall dimensions of the sealing frame, so that it can be as compact as possible.

The support structure can preferably be grid-like or matrix-like. This makes it possible to provide a particularly stable support structure. This design also leaves defined regions (free spaces) between the support structure into and through which, for example, parts of the luminaire optical system, such as lenses, can protrude. Consequently, the sealing frame can be recessed in the luminaire optical system—for example, with the support structure adapted to the luminaire optical system—in such a way that a luminaire equipped with the sealing frame can be particularly compact overall; in any case, the dimensions thereof are not enlarged. This means that existing luminaires can also be retrofitted with the sealing frame without impairing their visual properties or dimensions.

The support structure is preferably integrally formed with the main frame, which simplifies the manufacture thereof, increases stability and reduces overall manufacturing costs.

The support structure is preferably produced from a light-transparent material. This is particularly preferably the same light-transparent material as the main frame; this is in particular true if it is integrally designed. In this respect, even if a support structure is provided, it can also be provided in a visually unobtrusive manner, so that a highly stable supporting frame with a corresponding support structure can also be provided virtually invisibly.

The sealing element can protrude transversely and/or laterally outwardly away from the main frame in relation to the inner region. This allows the sealing element to be aligned and shaped according to the desired positioning.

The sealing element can preferably have an (at least partially) elongated and/or curved cross section when viewed in the direction of extension thereof (i.e., a direction along the peripheral extension thereof). An at least partially elongated cross section allows a defined provision for sealing at given regions spaced apart from the main frame. The provision of an at least partially curved cross section allows a defined shaping of the sealing element according to the structure to be sealed in order to achieve the most effective sealing action possible. Preferably, the curved cross section or cross-sectional portion has a U-shaped cross section or cross-sectional portion, which can thus be placed around a portion to be sealed, for example of a luminaire optical system, and thus achieves a particularly high sealing action. The U-shaped cross section (cross-sectional portion) can preferably be open along a side of the main frame facing away from the inner region (preferably the outer side) and preferably along the outer side of the main frame. This means that when the sealing frame is simply placed on/in a luminaire optical system, the U-shape, which is open in the direction of placement or insertion, can simply be placed on a corresponding portion to be sealed, for example of a luminaire optical system, and thus achieve a particularly effective sealing action with simple assembly.

The supporting frame can be formed integrally with the sealing element. This means that they are securely connected to one another, are easier to handle and can be assembled with increased process reliability. In a preferred embodiment, the supporting frame and the sealing element can be manufactured in one piece using a two-component injection molding process. Thus, the sealing frame can be produced in a particularly simple manner using conventional manufacturing processes, wherein the functional portions thereof are securely connected to each other and their properties can be individually adapted and adjusted by selecting suitable materials in order to preferably achieve a stable sealing frame with a high sealing action.

The supporting frame, preferably the main frame and/or support structure thereof, if present, is/are produced from a clear or opal material or of an optical plastics material, such as PMMA (polymethyl methacrylate). By using an appropriate material, the supporting frame or the components thereof as a whole can be provided to be as inconspicuous as possible and preferably substantially invisible when installed in a luminaire optical system in order to have no or as little influence as possible on the visual and aesthetic appearance of a luminaire equipped therewith.

The sealing element can comprise thermoplastic elastomers (TPE) or be produced from them. These materials can be used to provide highly effective sealing elements in a simple manner, for example in a two-component injection molding process.

According to a second aspect, the present invention relates to an optical system for a luminaire which, on the one hand, has a luminaire optical system. The luminaire optical system in turn has an optical side for light-influencing light emission in a main direction of radiation of a luminaire comprising the optical system. Furthermore, the luminaire optical system has an optical edge that protrudes from the rear side of the optical side against the main direction of radiation, is peripherally closed and, together with the optical side, defines an optical compartment. On the other hand, the optical system has a sealing frame according to the present invention, which is arranged with the supporting frame thereof at least partially or completely within the optical compartment, preferably detachably, in such a way that the sealing element sealingly peripherally rests or is arranged in a peripherally closed manner on the optical edge or at least on an end face of the optical edge facing away from the optical side.

The main direction of radiation of the luminaire according to the present invention describes, in particular in the center, a direction in which the light is to be primarily emitted by an illuminant and passes through the optical side. Whether and how the light is then emitted from the optical side and possibly deflected is not specified by the main direction of radiation.

The optical system according to the invention makes it possible to provide an existing luminaire optical system with a seal in an optional and reliable manner. The supporting frame ensures that the seal is dimensionally stable during handling before installation, during installation and after installation. In this way, the sealing element can be handled safely and positioned in a defined manner to achieve the maximum effective sealing action. The positioning of the sealing element is also simplified, because it is largely held in place by the supporting frame. As a result, the sealing frame allows simple variant handling of different luminaire optical system variants (sealed on the one hand and not sealed on the other hand) with a high level of functional integration and process reliability. For example, luminaire optical system with different optical sides (i.e., different light-influencing effects) but the same optical edge can all be optionally extended with a sealing function using the same type of sealing frame, so that a wide range of variants is possible with a small number of parts. Last but not least, the supporting frame, produced from a light-transparent material, allows the luminaire to be installed as inconspicuously or invisibly as possible in the luminaire optical system or in combination therewith. This means that the visual and aesthetic appearance of the luminaire optical system is not visually affected by the addition of the sealing function by means of the sealing frame. Preferably, existing luminaire optical systems can be easily retrofitted with the sealing frame to increase their protection rating.

The optical side can have optical structures on the coupling side facing the optical compartment and/or the decoupling side facing away from same. These can be lenses and/or fiber optic portions, for example. Other structures, such as a roughened surface or other light-directing, light-deflecting or light-scattering structures and the like are also conceivable. For example, it is conceivable that on the coupling side facing the optical compartment, the optical side of the luminaire optical system has lenses or lens structures through which light from illuminants provided in or toward the optical compartment of a luminaire fitted with the optical system can couple light for light emission in the main direction of radiation. The light coupled in this way can then be emitted, for example, on the decoupling side facing away from the optical compartment. The light can, for example, simply be emitted via a flat decoupling side. Alternatively, it is also conceivable that the decoupling side also has optical structures, such as the light guide portions described above, in order to guide the light to a defined light output. The design of the optical side in terms of the optical functions or light-influencing effect thereof is not limited by the present invention and can be designed as desired.

The optical structures, in particular the lenses provided on the coupling side facing the optical compartment, can preferably be arranged in a grid-like or matrix-like manner. In this way, a large-area defined light coupling of a plurality of light emission regions (e.g., a plurality of LED chips or LED clusters) of the illuminants or even a plurality of illuminants can be provided for light emission via the luminaire optical system. For example, an optical structure (such as a lens cup) can be assigned to each light emitting region or illuminant.

Preferably, the optical structures provided on the side facing the optical compartment can be at least partially delimited or surrounded laterally by the supporting frame in relation to the main direction of radiation, particularly preferably the main frame and/or support structure thereof; preferably without contact. This means that an optical system that is compact overall can be provided while the function of the sealing frame is fully maintained. Because the supporting frame or the main frame thereof and/or support structure touch the optical structures or preferably the optical side, and thus no optically active surfaces, this does not result in any optical interference, such as undesired light decoupling or light spots.

The sealing frame is preferably in direct contact with the luminaire optical system only via the optical edge. As a result, the sealing frame is limited to the sealing function thereof, and contact with optically active surfaces of the luminaire optical system can be safely avoided, which means that with a high sealing function there is only minimal to no optical interference due to the provision of the sealing frame. In order to increase the stability of the connection between the luminaire optical system and the sealing frame, it is conceivable, for example, that the sealing frame is supported with the main frame thereof and preferably with the outer side thereof on a side of the optical edge facing the optical compartment in order to accommodate the inserted sealing frame securely, for example by simple frictional connection. This means that an optical system assembled in this way can be handled safely, which also simplifies automated assembly, for example. It is also conceivable, for example, that latching or snap-in structures are provided between the supporting frame or main frame on the one hand and the optical edge on the other in order to snap the sealing frame onto the luminaire optical system. A corresponding snap-in sound can provide the fitter with feedback on the safe assembly of these two components. The optical edge can—preferably at least on the side thereof facing the optical compartment—taper or be inclined outward with increasing distance from the optical side in order to serve as a kind of insertion bevel for the sealing frame. The sealing frame or the main frame and in particular outer side thereof can also be aligned accordingly or run at an angle or tapered in order to serve as an insertion bevel. This can be achieved, for example, by tapering or wedging the cross section of the main frame as described above. This makes it easier to assemble the two components to form the optical system.

This means that the sealing frame can only be in direct contact with the luminaire optical system via the sealing element on the one hand and via the optical edge on the other. It is also conceivable that the sealing frame is in direct contact with the luminaire optical system only via the sealing element and also via the main frame or the outer side thereof facing away from the inner region on the one hand and via the optical edge on the other.

The luminaire optical system is preferably produced from the same material as the supporting frame or at least the main frame thereof. Due to the identical materiality of the luminaire optical system on the one hand and the supporting frame on the other, these components behave in the same way during operation. This means that during operation—for example due to operating heat or temperature fluctuations at the place of use—the luminaire optical system and sealing frame or main frame expand to the same length, so that there is no relative movement between these components, which in turn increases their functionality and leads to a secure and stable sealing action. Last but not least, the use of the same materials for these two components means that the sealing frame can be provided in a visually and aesthetically unobtrusive manner.

According to a further aspect, the present invention further relates to a luminaire comprising a luminaire housing and an optical system according to the present invention. The optical system is sealed off from the luminaire housing via the sealing element. The sealing element is preferably clamped between a sealing portion of the luminaire housing and the optical edge (e.g., the end face of the optical edge facing away from the optical side) to form a seal. In this way (i.e., through the sealing connection or the sealing clamping), the optical system with the luminaire housing delimits a closed luminaire compartment which has the optical compartment and is sealed off from the outside for accommodating illuminants for emitting light from the luminaire via the optical side (i.e., in the main direction of radiation of the luminaire).

By means of the optical system according to the invention and thus the sealing frame according to the invention, a luminaire can thus be fitted or retrofitted, which can then form a closed luminaire compartment with a high protection rating. Protection classes of IP 64 or higher are conceivable here, for example. In principle, it is of course conceivable that components or electrical cables are routed through the luminaire housing, for example, which in turn require a separate seal for the luminaire housing at the breakthrough points in order to maintain the sealed, closed luminaire compartment. The design options here are many and varied. The decisive factor here is that in particular the often weak contact point between the luminaire optical system on the one hand and the luminaire housing on the other can be sealed in a simple manner by the sealing frame according to the invention and consequently the protection rating of a luminaire compartment limited by these can be significantly increased.

The luminaire optionally also has corresponding illuminants, which are arranged in the luminaire compartment to emit light via the optical side. Preferably, the illuminants can be LED illuminants. These can, for example, take the form of one or more printed circuit boards with corresponding LED chips for emitting light. Other or individual or a plurality of LED modules are also conceivable. In principle, of course, the use of any other known illuminant is also conceivable. The illuminants preferably lie flat against the luminaire housing; this is particularly advantageous for LED illuminants so as to allow direct coupling of a printed circuit board for heat dissipation during operation.

According to a fourth aspect, the present invention further relates to a kit for providing an optionally sealing optical system according to the present invention for a luminaire, preferably a luminaire according to the present invention. The kit may comprise, on the one hand, a plurality of luminaire optical systems with optical edges identical to one another but with different optical sides, in particular for different light-influencing light emission, and on the other hand identical sealing frames for optional sealing contact with the sealing element on the optical edge of the respective luminaire optical system to form an optical system according to the present invention. Alternatively or additionally, the kit may comprise, on the one hand, a plurality of luminaire optical systems with mutually different optical edges and, on the other hand, a plurality of sealing frames for optional sealing contact with the respective sealing element on the corresponding optical edge of the respective luminaire optical system to form an optical system according to the present invention.

According to a fourth aspect, the present invention further relates to a kit for providing an optionally sealed luminaire. The kit has a luminaire housing. Furthermore, the kit has a plurality of luminaire optical systems; these have optical edges identical to one another but different optical sides, in particular for different light-influencing light emission, each for connection to the luminaire housing to define a luminaire compartment for accommodating illuminants for emitting light from the luminaire via the corresponding optical side. Furthermore, the kit comprises a sealing frame according to the present invention for optional sealing contact with the sealing element on the respective optical edges of the respective luminaire optical system of the kit to form a luminaire according to the present invention.

The kits described above can be used to provide a large number of variants of optical systems or luminaires, each with and preferably also optionally without a sealing action, with a small number of parts by optionally providing the sealing frame according to the invention.

BRIEF DESCRIPTION OF THE DRAWINGS

Further embodiments and advantages of the present invention are described hereinafter with reference to the figures of the accompanying drawings. In the figures.

DETAILED DESCRIPTION OF EXEMPLARY EMBODIMENT

Figure 9:
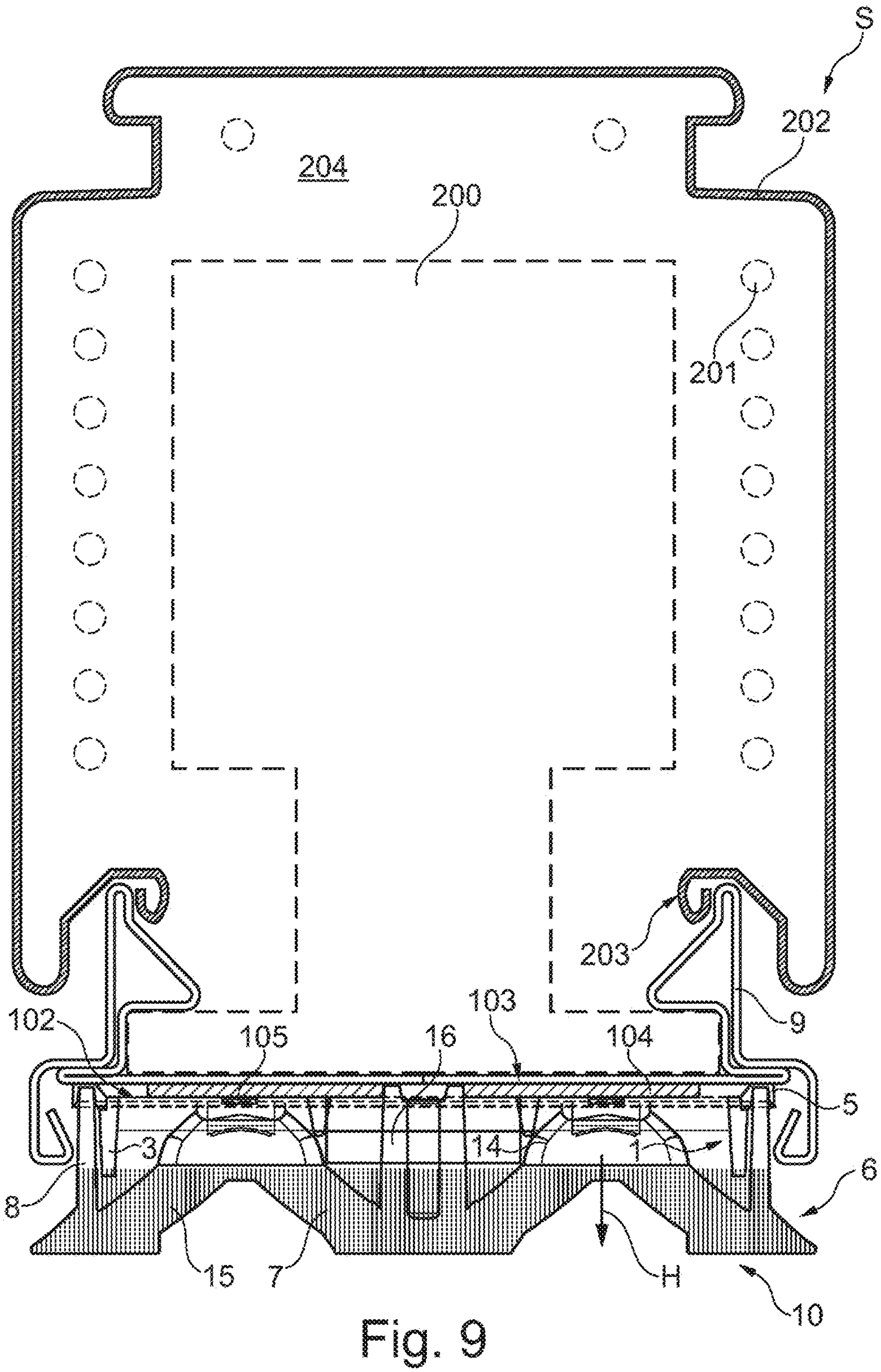
FIG. 9 is a luminaire system fitted with the luminaire according to the invention as shown in FIG. 7.

The figures show an example of an embodiment of a sealing frame 1 according to the invention for sealing insertion between a luminaire optical system 6 and a luminaire housing 9 of a luminaire 100, as will be described below. In the example shown, the luminaire 100 is a so-called bar luminaire. This can be used in a luminaire system S with an elongated luminaire support rail 202. Such bar luminaires usually have an elongated extension of usually 500 mm and can be arranged in any number in a row and in some cases interrupted by other electronic components on the luminaire support rail 202 to form an elongated strip light. A cross section of such a luminaire system L is shown by way of example in FIG. 9 and will be described in more detail below. In principle, however, the invention is not limited to such luminaires, such as bar luminaires, but can be applied to any kind of luminaires that have interconnected luminaire optical systems and luminaire housings, which should preferably be sealed between each other.

Figure 1:
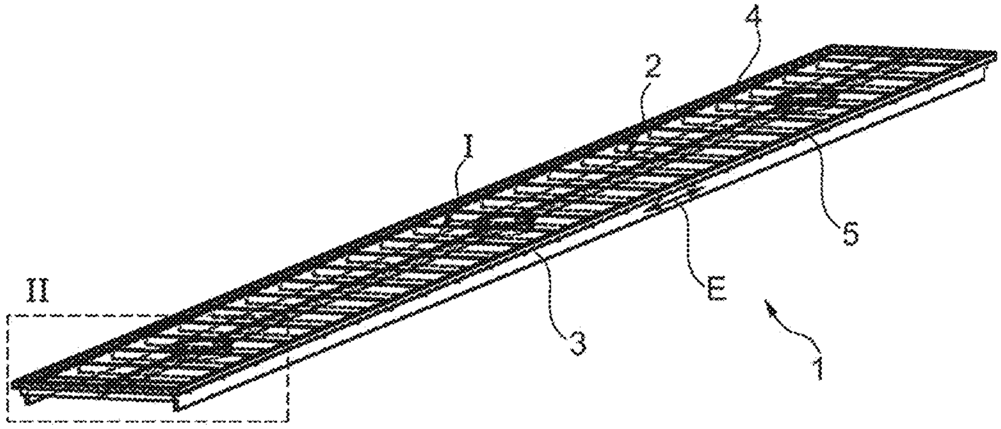
FIG. 1 is a perspective view of a sealing frame according to the present invention.

As can be seen from the figures, the sealing frame described above, which forms an independent part of the present invention, has a supporting frame 2. The supporting frame 2 in turn has a peripherally extending main frame 3 surrounding an inner region I, as can be seen in particular in FIG. 1. As can also be seen from FIG. 1, the main frame 3 preferably extends in a peripherally closed manner. The supporting frame 3 forms a largely dimensionally stable support structure. In principle, it is also conceivable that the main frame 3 is slotted, for example, in order to allow a certain flexibility, for example for resilient deformation, in order to simplify the installation of the sealing frame 1, for example. However, it is particularly preferable for the main frame 3 to be peripherally closed, as shown in FIG. 1. As can also be seen from FIG. 1, the direction of extension E of the main frame 3 can substantially run in one plane in order to allow for a design that is as compact as possible.

Figure 3:
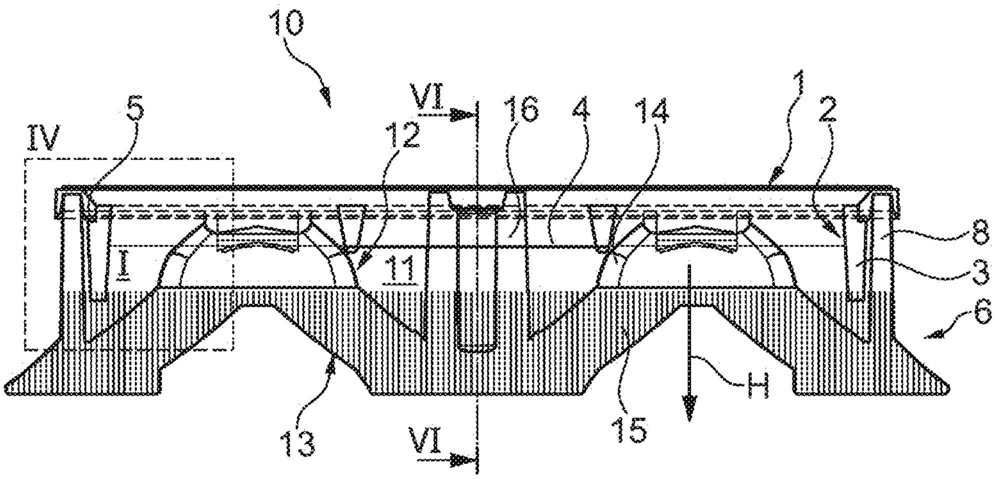
FIG. 3 is an end-face sectional view of an optical system according to the invention with the sealing frame according to the invention as shown in FIG. 1.
Figure 4:
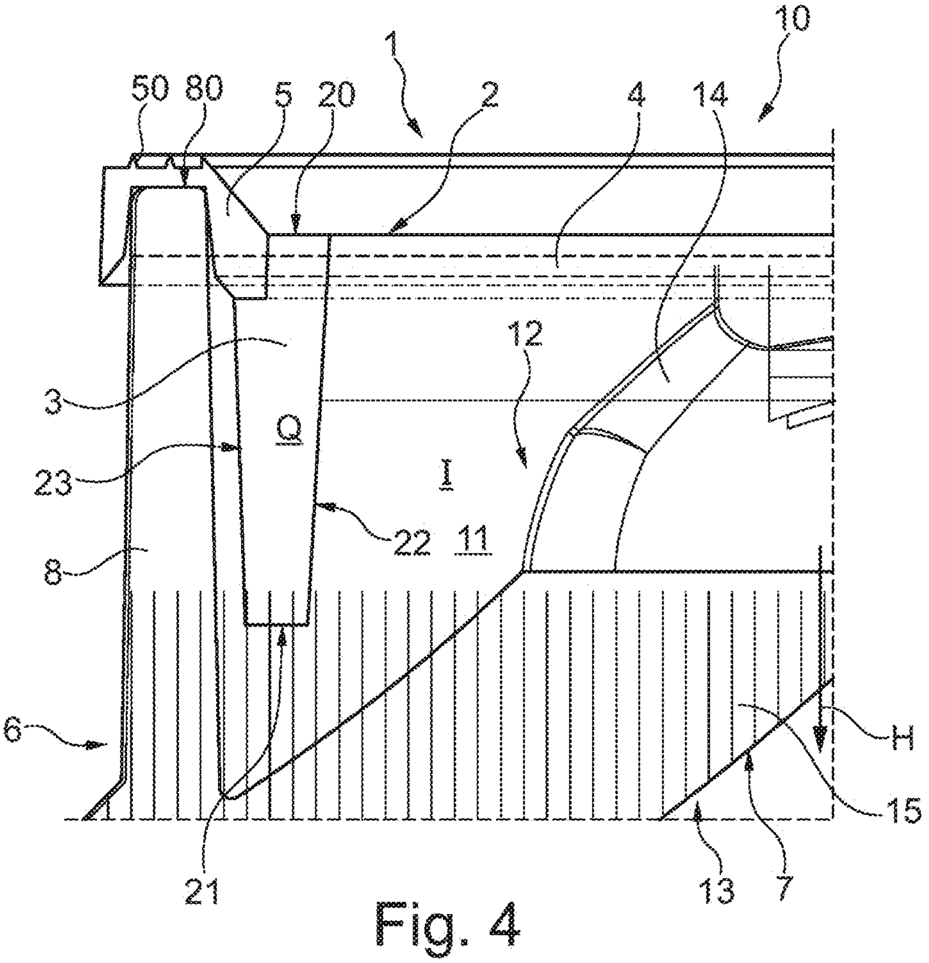
FIG. 4 is a detailed view (detail IV) of the optical system according to the invention as shown in FIG. 3.

With reference in particular to FIGS. 3 and 4, the main frame 3 can have an elongated cross section Q, when viewed in the direction of extension E thereof, in this case with an inner side 22 and outer side 23 extending between two opposite end faces 20, 21, wherein the inner side 22 then faces the inner region I described above. In the present case, the main frame 3 therefore has a cross-sectional shape that is structurally elongated transversely to the plane of extension thereof, so that the main frame 3 can be particularly dimensionally stable on the one hand and compact on the other. As can also be clearly seen in FIG. 4, the elongated cross-sectional area Q of the main frame 3 can taper from one of the end faces (in this case the upper end face 20) to the opposite end face (in this case the lower end face 21). When viewed in the direction of extension E, the main frame 3 thus preferably has a slightly wedge-shaped form, which facilitates the installation thereof in a luminaire optical system 6.

Figure 2:
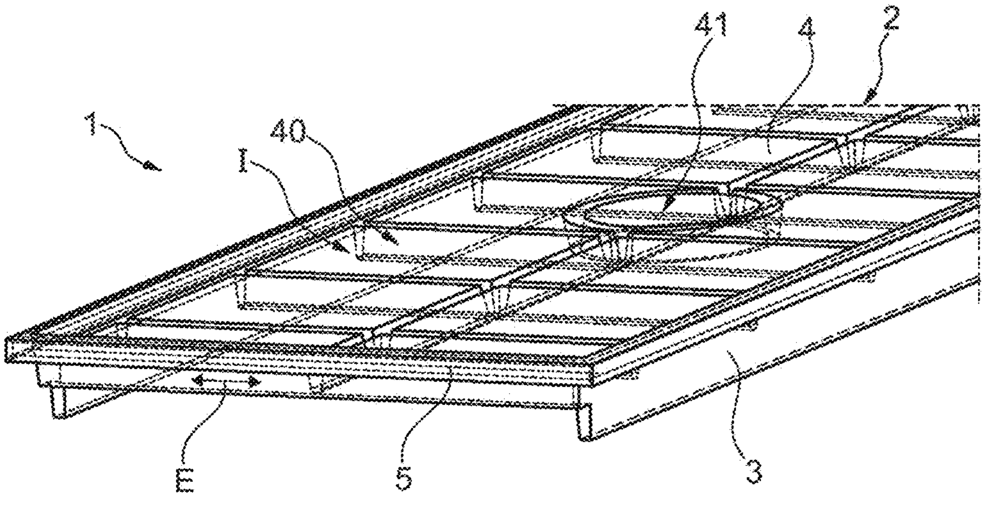
FIG. 2 is a detailed view (detail II) of the sealing frame according to the invention according to FIG. 1.

As can be seen in particular from FIGS. 1 and 2, the supporting frame 2 can also have a support structure 4 which reinforces the main frame 3 and is connected to the main frame 3 and preferably the inner side 22 thereof.

As can be seen in FIG. 1 in particular, the support structure 4 can extend at least partially or, in this case, completely in the inner region I, so that an overall compact design results despite the presence of the support structure 4.

As can also be seen in FIGS. 1 and 2, the support structure 4 can be grid-like or matrix-like. This results in free spaces 40, 41 formed by this grid or matrix structure which serve to accommodate optical or non-optical elements of a luminaire optical system to be connected to the sealing frame 1, preferably without contact. This is described in more detail below.

The support structure 4 is preferably integrally formed with the main frame 3 to form the supporting frame 2 and is manufactured in the present case, for example, as a one-piece injection-molded part.

The supporting frame 2, or at least the main frame 3 thereof, is produced from a light-transparent material. The support structure 4 can also be produced from a light-transparent material, preferably from the same light-transparent material as the main frame 3. Clear or opal materials are particularly suitable as light-transparent materials. The light-transparent material is, for example, an optical plastics material such as PMMA.

Furthermore, the sealing frame 1 has a sealing element 5, which is connected to the main frame 3 in such a way that the sealing element 5 extends in a peripherally closed manner along the main frame 3 and protrudes away from same. This is illustrated by way of example in FIG. 1 to 4.

As can be seen in particular from FIGS. 3 and 4, the sealing element 5 can preferably extend from one of the end faces 20, 21 (in this case the upper end face 20). The sealing element 5 can extend at least partially in the direction of the longitudinal cross-sectional extension of the main frame 3 and/or laterally outwardly in relation to the inner region 22.

As can be seen in particular from FIG. 4, the sealing element 5—shown here in cross section—protrudes transversely in relation to the inner region I and/or laterally outwardly away from the main frame 3. The sealing element 3 can have an elongated and/or curved cross section when viewed in the direction of extension thereof. This can be a U-shaped cross section, for example, as shown in FIG. 4. This can preferably be open along a side of the main frame 3 facing away from the inner region I and preferably along the outer side 23 thereof. In the exemplary embodiment shown, the sealing element 5 here extends upwardly and outwardly away from the upper end face 20 at a slight angle, and then curves downward to form the U-shape shown, which is open toward the bottom. This U-shape can preferably be used to enclose a corresponding portion to be sealed and thus be securely connected thereto.

The sealing element 5 can preferably have sealing structure elements, such as the sealing lamellae 50 shown in FIG. 4. These preferably protrude from the sealing element 5 and are provided on portions of the sealing element 5 that are effective for sealing; here, for example, on upward-facing portions that are to come into sealing contact with a luminaire housing 9, as shown by way of example in FIG. 7 to 9.

In a preferred embodiment, the supporting frame 2, at least the main frame 3 thereof, can be integrally formed with the sealing element 5, as can be seen in FIG. 4, for example. Preferably, the supporting frame 2 and the sealing element 5 are manufactured in one piece using a two-component injection molding process.

The sealing element 5 is preferably produced from or comprises a thermoplastic elastomer (TPE). Other materials suitable for a seal are also conceivable; in particular those that can be used in a two-component injection molding process.

With reference in particular to FIG. 3 to 6, the optical system 10 for a luminaire 100 according to the invention is described below.

On the one hand, the optical system 10 has the luminaire optical system 6 already described above. The luminaire optical system 6 in turn has an optical side 7 for light-influencing light emission in a main direction of radiation H of a luminaire 100 comprising the optical system 10. Furthermore, the luminaire optical system 6 has an optical edge 8 that protrudes from the rear side (upward in the figures) of the optical side 7 counter to the main direction of radiation H, is peripherally closed, and together with the optical side 7 delimits an optical compartment 11.

The optical side 7 preferably has optical structures 14, 15 on the coupling side 12 facing the optical compartment 11 and/or the decoupling side 13 facing away from same. These optical structures 14, 15 can, for example, be lenses or lens portions 14 and/or light guide portions 15. In the exemplary embodiment shown here in FIGS. 5 and 6, the optical structures 14 facing the optical compartment 11 are designed as lenses or lens pots in order to guide light coupled into the optical compartment 11 via the optical side 7 in an optically influenced manner for light emission. On the decoupling side 13 facing away from the optical compartment 11, the optical structures 15 here have light guide portions which serve to deflect and emit light in a defined manner. The light guide portions 15 are preferably optically coupled here with the corresponding lenses 14 in such a way that light coupled into the lenses 14 is guided via the light guide portions 15 and ultimately emitted via the optical side 7.

The optical structures 14, 15, and in particular the lenses 14 provided on the coupling side 12 facing the optical compartment 11, are preferably arranged in a grid-like or matrix-like manner.

Figure 5:
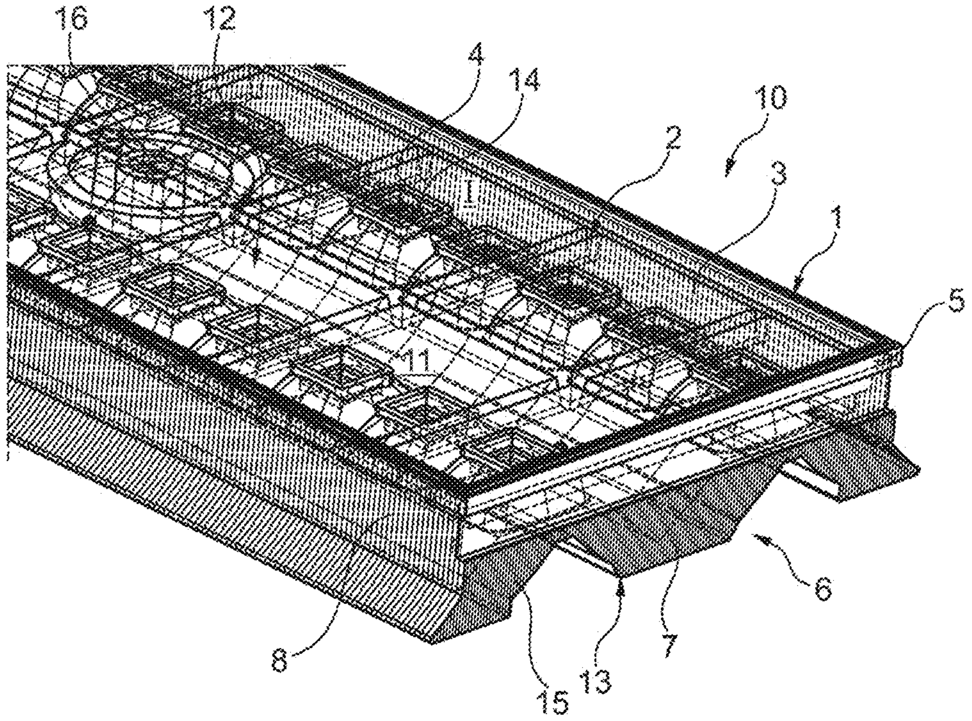
FIG. 5 is a partial perspective view of the optical system according to the invention according to FIG. 3.
Figure 6:
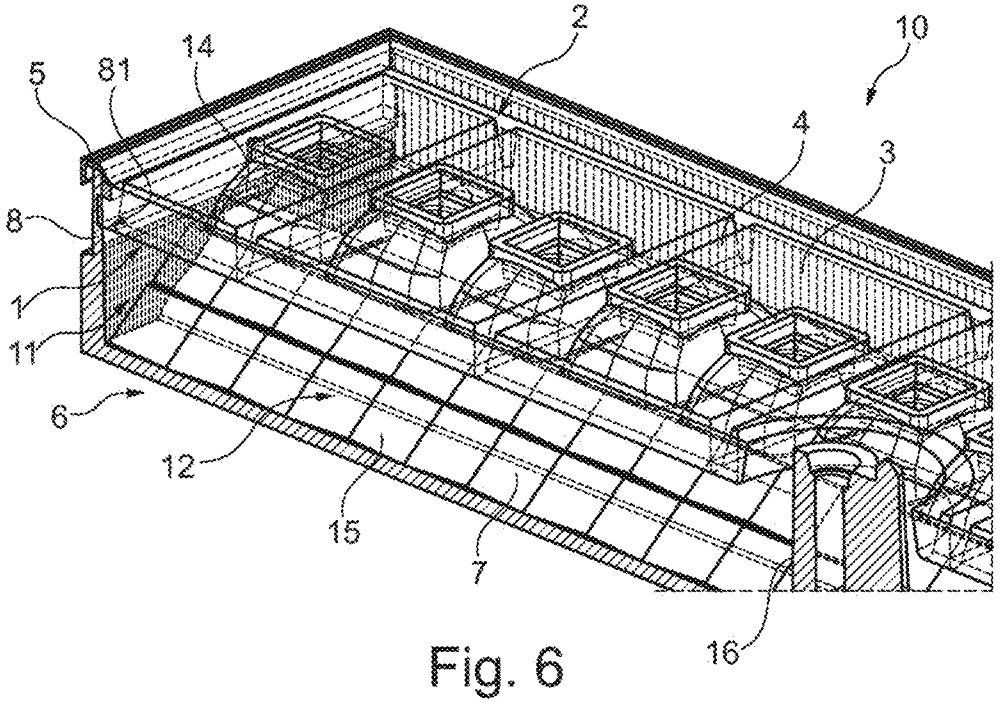
FIG. 6 is a partial perspective view of the optical system according to the invention as shown in FIG. 3 in longitudinal section along the sectional line VI-VI as shown in FIG. 3.

The optical system 10 further comprises the sealing frame 1 according to the invention that is already described above. As shown in FIGS. 5 and 6, the sealing frame 1 is arranged (i.e., in a recessed manner)—in this case preferably detachably—so that the sealing element 5 rests on or is arranged on the optical edge 8 or at least on an end face 80 of the optical edge 8 facing away from the optical side 7 in a peripherally closed manner with the supporting frame 2 thereof at least partially or, in this case, completely within the optical compartment 11. The sealing frame 1 can thus preferably serve as an insert for the luminaire optical system 6 in order to optionally equip the latter with a sealing function. Because the supporting frame 2 or at least the main frame 3 thereof is produced from a light-transparent material, it recedes into the background visually in relation to the luminaire optical system 6 and can therefore be provided inconspicuously or even invisibly, so that a high level of functional integration and process reliability can be achieved without visual and aesthetic disadvantages. In principle, it is conceivable that the sealing frame 1 could also be permanently connected to the luminaire optical system 6, for example by bonding or by manufacturing the sealing frame 1 integrally with the luminaire optical system 6, for example in a two-component injection molding process.

As can be seen in particular from FIGS. 5 and 6, the optical structures 14 provided on the coupling side 12 facing the optical compartment 11—in this case, for example, designed as lenses or lens pots 14—can be at least partially delimited or surrounded laterally in relation to the main direction of radiation H by the supporting frame 2, particularly preferably by the main frame 3 and/or by the support structure 4, preferably without contact. In the exemplary embodiment shown, this is achieved by adapting the grid of the support structure 4 to the grid of the optical structures 14, so that in this case one to two lenses 14 are always surrounded laterally by a respective grid structure. This means that an overall compact design can be achieved. Because the support structure 4 or the main frame 3 does not touch the optical structures 14, 15, unnecessary optical interference can be avoided. In addition to the free spaces 40 formed by the grid, through which the corresponding optical structures (lenses 14) protrude here, further free spaces 41 can also be formed. Fastening structures 16 and the like can, for example, be reached through these further free spaces 41 or protrude into or through them. They can be used, for example, to support or align or attach an illuminant 103 or to attach or align the luminaire optical system 6 to a luminaire housing 9.

Preferably, the sealing frame 1 is in direct contact with the luminaire optical system 6 only via the optical edge 8. Preferably, the sealing frame 1 can be in direct contact here with the luminaire optical system 6 only via the sealing element 5 on the one hand and via the optical edge 80 or the upper end face 80 thereof on the other, so that on the one hand the placement of the seal is easily ensured and on the other hand optical interference can be minimized. In principle, it is also conceivable that the sealing frame 1 is in direct contact with the luminaire optical system 6 only via the sealing element 5 and also via the main frame 3 or the outer side 23 thereof facing away from the inner region I on the one hand and via the optical edge 8 on the other. Here, as shown in FIG. 4, the sealing element 5 can rest on top of the upper end face 80 of the optical edge 8 for sealing contact. Furthermore, the main frame 3 can be in contact with a side 81 of the optical edge 8 facing the optical compartment 11 via the outer side 23 thereof, as can be seen in FIG. 6, for example, by means of a frictional connection. In this way, a secure positioning and connection—preferably detachable—can be provided between the sealing frame 1 on the one hand and the luminaire optical system 6 on the other without causing optical interference to the luminaire optical system 6, particularly via the optical side 7 thereof, because the sealing frame 1 is only in contact with optically inactive portions of the luminaire optical system 6.

The luminaire optical system 6 is preferably produced from the same material as the supporting frame 2 or at least the main frame 3 thereof. This in turn can prove to be particularly advantageous in operation with regard to the same characteristic properties, in which, for example, their linear expansion behaves the same due to the same materiality and thus relative movements between these elements can be avoided.

Figure 7:
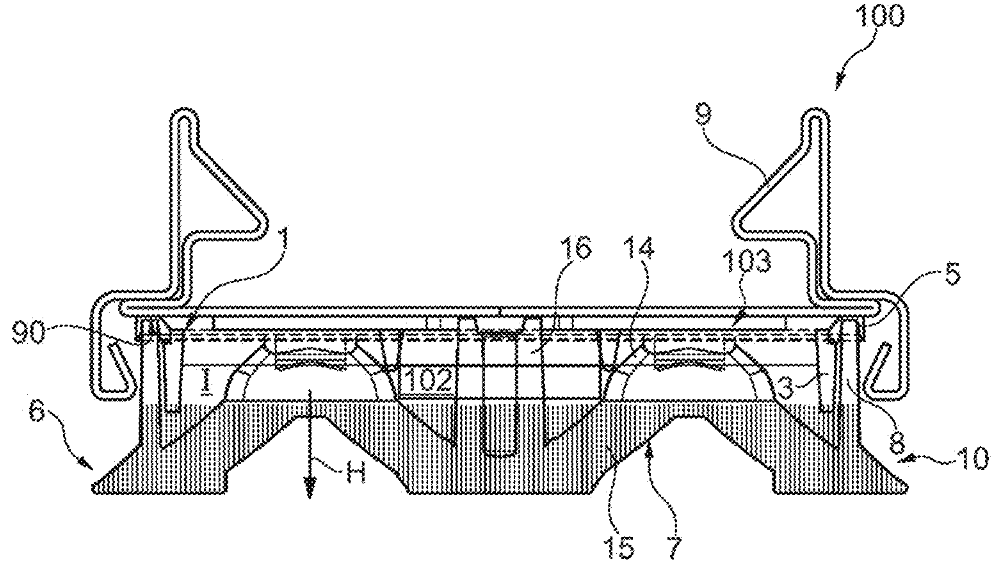
FIG. 7 is an end-face cross-sectional view of a luminaire according to the invention with an optical system according to the invention as shown in FIG. 3 (here in the form of a bar luminaire for a luminaire system)
Figure 8:
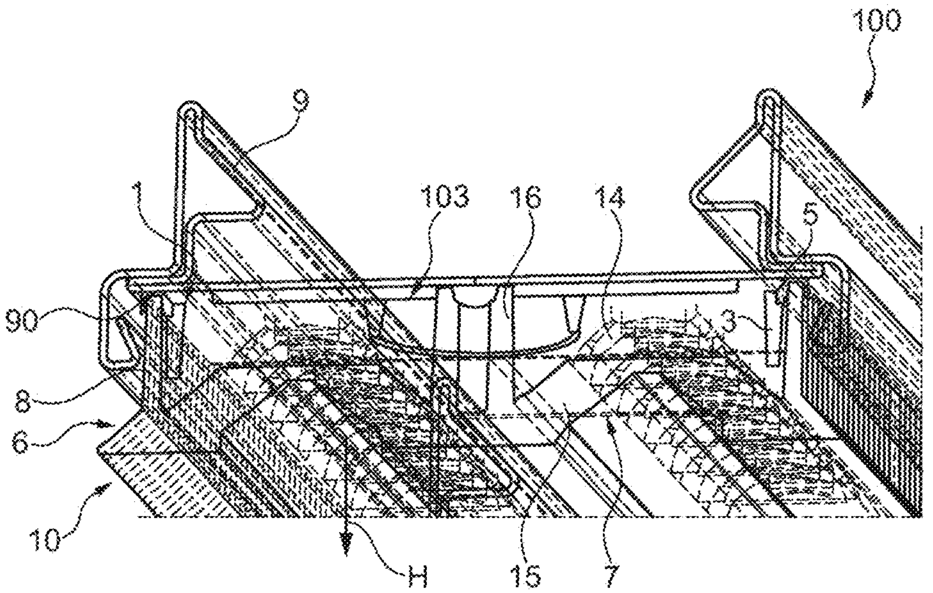
FIG. 8 is a partial perspective view of the luminaire according to the invention according to FIG. 7.

With reference to FIGS. 7 and 8, the present invention relates further to a luminaire 100 which, in addition to the optical system 10 described above, further comprises a luminaire housing 9. The luminaire housing 9 is provided here as a formed structural sheet metal part, wherein basically any type of luminaire housing 9 is nevertheless conceivable.

The optical system 10 is sealingly connected to the luminaire housing 9 via the sealing element 5. In the design example shown here, the sealing element 5 is arranged or clamped between a (peripherally closed) sealing portion 90 of the luminaire housing 9 and the optical edge 8 (in this case the end face 80 facing away from the optical side 7). This creates a peripherally closed sealing region between the luminaire housing 9 and the luminaire optical system 6. The provision of the sealing frame 1 with the sealing element 5 thereof between the luminaire housing 9 and the optical system 10 means that the optical system 10 with the luminaire housing 9 delimits a closed luminaire compartment 102, which has the optical compartment 11 and is sealed off from the outside, for accommodating illuminants 103 for emitting light from the luminaire 100 via the optical side 7. Thus, by providing the sealing frame 1, a luminaire 100 according to the invention can be converted to a higher protection rating, e.g., IP 64 or higher.

As can be seen in particular from FIGS. 7 and 8, the luminaire 100 can have the illuminants 103 already described above. These are preferably LED illuminants, such as LED chips 105 provided here on a circuit board 104 or LED modules designed in a different way. The illuminants 103 are arranged in the luminaire compartment 102 to emit light via the optical side 7. As shown in FIGS. 7 and 8, the back of the circuit board 104 of the illuminant 103 can lie flat against the luminaire housing 9, allowing heat generated during operation to be safely dissipated.

As already mentioned, the luminaire 100 can, for example, be a bar luminaire of a luminaire system S. In this case, the luminaire 100 can, for example, have mechanical coupling elements (not shown) and/or electrical coupling elements 200. The electrical coupling elements 200 are electrically connected or connectable to the illuminants 103 and are used for optional electrical coupling of electrical lines 201 of the luminaire system S. In the exemplary embodiment shown here, the luminaire system S has a luminaire support rail 202 with a substantially U-shaped cross section. The electrical coupling element 200 can be inserted into an interior 204 of the luminaire support rail 202, and thus into the luminaire support rail 202, via the lateral (here: lower) opening 203 formed by the U-shaped cross section. In the interior 204 thereof, the luminaire support rail 202 comprises the electrical lines 201, which preferably run along the longitudinal direction (here: on both sides at opposite side walls of the luminaire support rail 202). These are provided, for example, in the form of a busbar which carries the electrical lines 201 in an insulating body (not shown here) so that the electrical lines 201 can be electrically contacted from the interior 204, preferably over the entire length of the busbar or the luminaire support rail 202, via the electrical coupling element 200 and preferably via electrical contacts (not shown) protruding laterally therefrom. In order to optionally provide and release electrical contacting in an easy manner, the electrical coupling element 200 can be designed, for example, as a so-called "rotary knob" as known, for example, from the applicant's "TECTON" system. After inserting the rotary knob 200 into the luminaire support rail 202, the electrical contacts are pivoted out laterally by rotation of the rotary knob 200 in order to be electrically contacted with the lines 201 of the busbar situated laterally in relation thereto.

By means of the system according to the invention, it is thus possible, for example, by providing a plurality of luminaire optical systems 6 with optical edges 8 identical to one another but different optical sides 7, in particular for different light-influencing light emission, as well as, on the other hand, identical sealing frames 1 for optional sealing contact with the sealing element 5 on the optical edge 8 of the respective luminaire optical system 6 to form an optical system 10, to realize a kit for providing an optional sealing optical system 10 which allows for a high number of variants with a small number of parts; namely, always one variant of a luminaire optical system with a sealing action and one without.

It is also possible to realize a kit for providing an optionally sealing optical system 10 with a plurality of variants and a small number of parts by providing, on the one hand, a plurality of luminaire optical systems 6 with different optical edges 8 and, on the other hand, a plurality of sealing frames 1 for optional sealing contact with the respective sealing element 5 on the corresponding optical edge 8 of the respective luminaire optical system 6 to form an optical system 10.

Overall, a kit for providing an optionally sealed luminaire 100 can be realized with the components described above. This kit then has a luminaire housing 9. Furthermore, the kit has a plurality of luminaire optical systems 6 with optical edges 8 identical to one another but with different optical sides 7, in particular for different light-influencing light emission, in each case for connection to the luminaire housing 9 for defining a luminaire compartment 102 for accommodating illuminants 103 for emitting light from the luminaire 100 via the corresponding optical side 7. In addition, the kit has a sealing frame according to the invention for optional sealing contact with the sealing element 5 on the respective optical edges 8 of the respective luminaire optical system 6 within the meaning of the optical system 10 according to the invention, in each case to form a luminaire 100 according to the invention.

The present invention is not limited by exemplary embodiments described above to the extent that it is covered by the subject matter of the following claims.

The invention claimed is:

1. An optical system (10) for a luminaire (100), having:

a luminaire optical system (6) with an optical side (7) for light-influencing light emission in a main direction of radiation (H) of a luminaire (100) comprising the optical system (10), and an optical edge (8) which protrudes from the rear side of the optical side (7), counter to the main direction of radiation (H), is peripherally closed, and together with the optical side (7) delimits an optical compartment (11), and a sealing frame (1) for sealing insertion between a luminaire optical system (6) and a luminaire housing (9) of a luminaire (100), comprising a supporting frame (2) having a peripherally extending main frame (3) surrounding an inner region (I), wherein the supporting frame (2) or at least the main frame (3) thereof is produced from a light-transparent material, and a sealing element (5) which is connected to the main frame (3) in such a way that the sealing element (5) extends in a peripherally closed manner along the main frame (3) and protrudes away from same;

wherein the sealing frame is arranged with the supporting frame (2) thereof at least partially or completely within the optical compartment (11), detachably, in such a way that the sealing element (5) sealingly peripherally rests or is arranged in a peripherally closed manner on the optical edge (8) or at least on an end face (80) of the optical edge (8) facing away from the optical side (7).

2. The optical system (10) according to claim 1, wherein the optical side (7) has optical structures (14, 15) comprising lenses (14) and/or light guide portions (15) on the coupling side (12) facing the optical compartment (11) and/or the decoupling side (13) facing away from same, wherein the lenses (14) provided on the coupling side (12) facing the optical compartment (11) are arranged in a grid-like or matrix-like manner, and/or wherein the optical structures (14) provided on the coupling side (12) facing the optical compartment (11) are at least partially delimited or surrounded laterally in relation to the main direction of radiation (H) by the supporting frame (2) without contact.

3. The optical system (10) according to claim 1, wherein the sealing frame (1) is in direct contact with the luminaire optical system (6) only via the optical edge (8), wherein the sealing frame (1) is in direct contact with the luminaire optical system (6) only via the sealing element (5) and also via the main frame (3) or the side thereof (23) facing away from the inner region (I) on the one hand and via the optical edge (8) on the other hand.

4. The optical system (10) according to claim 1, wherein the luminaire optical system (6) is produced from the same material as the supporting frame (2) or at least the main frame (3) thereof.

5. A luminaire (100), comprising:

a luminaire housing (9), an optical system (10) according to claim 1, which is sealingly connected to the luminaire housing (9) via the sealing element (5), the sealing element (5) is sealingly clamped between a sealing portion (90) of the luminaire housing (9) and the optical edge (8), so that the optical system (10) with the luminaire housing (9) delimits a closed luminaire compartment (102), which has the optical compartment (11) and is sealed off from the outside, for accommodating illuminants (103) for emitting light from the luminaire (100) via the optical side (7), and LED illuminants (103) are arranged in the luminaire compartment (102) for emitting light via the optical side (7), lying flat against the luminaire housing (9).

6. A kit for providing an optionally sealed luminaire (100), comprising:

a luminaire housing (9), a plurality of luminaire optical systems (6) with optical edges (8) identical to one another but with different optical sides (7), in particular for different light-influencing light emission, in each case for connection to the luminaire housing (9) for defining a luminaire compartment (102) for accommodating illuminants (103) for emitting light from the luminaire (100) via the corresponding optical side (7), and a sealing frame (1) for sealing insertion between the luminaire optical system (6) and the luminaire housing (9) of a luminaire (100), comprising:

a supporting frame (2) having a peripherally extending main frame (3) surrounding an inner region (I), wherein the supporting frame (2) or at least the main frame (3) thereof is produced from a light-transparent material; and a sealing element (5) which is connected to the main frame (3) in such a way that the sealing element (5) extends in a peripherally closed manner along the main frame (3) and protrudes away from same;

wherein the sealing frame is configured to be inserted between the luminaire housing and the luminaire optical system such that the sealing element (5) is sealingly clamped between the luminaire housing and the luminaire optical system;

wherein the sealing frame makes sealing contact with the sealing element (5) on the respective optical edges (8) of the respective luminaire optical system (6), in each case to form the luminaire (100) comprising the luminaire housing (9) with the optical system (10) sealingly connected to the luminaire housing (9) via the sealing element (5), the sealing element (5) being sealingly clamped between a sealing portion (90) of the luminaire housing (9) and the optical edge (8), so that the optical system (10) with the luminaire housing (9) delimits a closed luminaire compartment (102), which has the optical compartment (11) and is sealed off from the outside, for accommodating illuminants (103) for emitting light from the luminaire (100) via the optical side (7), and LED illuminants (103) are arranged in the luminaire compartment (102) for emitting light via the optical side (7), lying flat against the luminaire housing (9).

* * * * *